United States Patent [19]

Gebert et al.

[11] 3,915,980

[45] Oct. 28, 1975

[54] IMIDAZOLYL-(2)-THIO-ALKANOIC ACID ESTERS

[75] Inventors: Ulrich Gebert; Ernold Granzer, both of Kelkheim, Germany

[73] Assignee: Hoechst Aktiengesellschaft, Frankfurt am Main, Germany

[22] Filed: Dec. 4, 1973

[21] Appl. No.: 421,603

[30] Foreign Application Priority Data

Dec. 6, 1972 Germany.............................. 2259627

[52] U.S. Cl................................. 260/309; 424/273
[51] Int. Cl.²....................................... C07D 233/64
[58] Field of Search..................................... 260/309

[56] References Cited
UNITED STATES PATENTS

| | | | |
|---|---|---|---|
| 3,636,003 | 1/1972 | Doebel et al. ...................... | 260/309 |
| 3,819,646 | 6/1974 | Tweit................................. | 260/309 |

Primary Examiner—Sherman D. Winters
Attorney, Agent, or Firm—Curtis, Morris & Safford

[57] ABSTRACT

Imidazolyl-(2)-thioalkanoic acid ester of the formula I

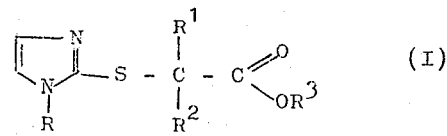

in which
R stands for phenyl, phen-($C_1$—$C_3$)alkyl,
$R^1$ stands for hydrogen or ($C_1$—$C_3$)-alkyl and
$R^2$ and $R^3$ each stands for ($C_1$—$C_3$)-alkyl,
and the physiologically acceptable acid addition salts thereof, process for preparing them and pharmaceutical preparations containing them as active substance.

5 Claims, No Drawings

IMIDAZOLYL-(2)-THIO-ALKANOIC ACID ESTERS

The present invention relates to imidazolyl-(2)-thioalkanoic acid esters of the general formula I

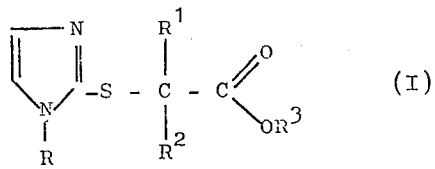

in which
R stands for phenyl, phen($C_1$—$C_3$)alkyl,
$R^1$ stands for hydrogen or $C_1$—$C_3$-alkyl and
$R^2$ and $R^3$ each stands for $C_1$—$C_3$-alkyl,
and the physiologically acceptable acid addition salts thereof.

The free compounds as well as the salts thereof have hypolipemic properties and can, therefore, be used as medicaments.

The present invention also relates to a process for the manufacture and to pharmaceutical preparations of these compounds.
Preferably,
R stands for phenyl and benzyl,
$R^1$ stands for hydrogen and methyl,
$R^2$ and $R^3$ each stands for methyl, ethyl, propyl and isopropyl.

The compounds of the invention are manufactured according to a known method which comprises reacting corresponding 1-substituted 2-mercaptoimidazoles of the general formula II

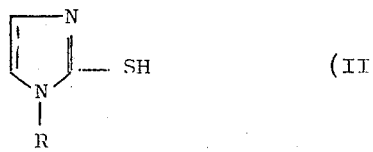

in which R is defined as above, with 2-halogenated carboxylic acid esters of the formula III

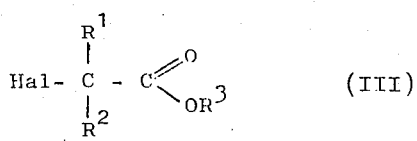

in which $R^1$, $R^2$ and $R^3$ are defined as in formula I and Hal is Cl, Br, I.

A preferred embodiment of the process of the invention consists in reacting the 2-mercaptoimidazoles of the formula II with basic components, such as alkali metal hydroxides, alkali metal carbonates, alkali metal alcoholates, alkali metal amides or alkali metal hydrides in the usual solvents at 0° – 25°C to yield mercaptides of the formula IV

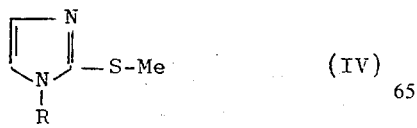

(Me = alkali metal; especially sodium or potassium) and reacting them in a manner known per se with the halides III at temperatures within the range of from 0° to 160°C.

For this purpose, the following procedure without isolating the intermediate and using sodium hydride in dimethyl formamide, is especially suitable: the thioalcohol II is introduced at 0° – 25°C into the suspension of a stoichiometric amount of sodium hydride in dimethyl formamide, which soon yields a clear solution with the formation of the mercaptide IV (Me = sodium) to which the halogenated compound III is added dropwise in equivalent amount, at 0° – 25°C. The reaction can be accelerated by subsequent heating for a short time, for example for 30 – 90 minutes. After distilling off the dimethyl formamide under vacuum, the residue is taken up in a solvent not miscible with water, for example chloroform or methylene chloride and the sodium halide formed during the reaction is washed out with water.

The crude products are purified either by distilling the bases which can then be converted into salts by means of physiologically acceptable acids, or, after salt formation, by recrystallization from suitable solvents, for example, an ethanol/ether mixture.

For the manufacture of those acid addition salts, for example hydrochloric acid, hydrobromic acid, sulfuric acid, phosphoric acid, methane sulfonic acid, p-toluenesulfonic acid, acetic acid, lactic acid, succinic acid, tartaric acid and maleic acid can be used.

The starting products of the formula II are generally known and can easily be manufactured according to the imidazole synthesis of Marckwald (cf. K. Hofmann "Imidazole and Its Derivatives," New York, 1953) from aminoacetaldehyde-diethylacetal and alkyl- or aryl-isothiocyanates [cf. inter alia Chem. Ber. 22, 568, 1354 (1889) or J. Med. Chem. 12, 1024 (1969)] or from N-substituted aminoacetaldehyde-acetals and alkali metal rhodanides [for example, J. Amer. Chem. Soc. 71, 384 (1949)].

The thioethers of the formula I have valuable pharmacological properties. While having a low acute toxicity (see $LD_{50}$-values in table 1) they are capable of reducing the lipid level in the blood considerably and to impede experimentally produced hyperlipemiae extraordinarily. Upon being examined in the following animal tests, they proved to be superior to the known clofibrat [2-(p-chlorophenoxy)-isobutyric acid-ethyl ester] which served as comparison substance.

A. STANDARD TEST ON MALE RATS HAVING A NORMAL SERUM LIPID CONTENT

The test period lasted 8 days. The doses administered per os by means of an esophagal sound were 30, 10 or 3 mg/kg/day. Generally, prior to and after the treatment, blood samples were taken and the concentration of cholesterol in the serum was determined according to the method of Lauber and Richterich and that of triglycerides according to the method of Eggstein and Kreutz. The values of the reduction of the serum lipid content calculated from the experimental data are shown in the following Table I.

TABLE I

Hypolipemic activity:

| Compound of example (LD$_{50}$* in g/kg) | Change in percentage after oral administration of 8 doses in mg/kg/days | | | | | |
|---|---|---|---|---|---|---|
| | 30 | | 10 | | 3 | |
| | serum cholesterol | serum triglyceride | serum cholesterol | serum triglyceride | serum cholesterol | serum triglyceride |
| | A    B | A    B | A    B | A    B | A    B | A    B |
| 1 (2.5) | −20/−39 | /−49 | −15/−6 | −65/−54 | −18/−7 | −31/−31 |
| 2 (4.4) | | | /−15 | /−40 | | |
| 3 (3.0) | | | −12/−17 | /−12 | | |
| 4 (>8) | | −22/−20 | −4/−15 | /−12 | | |
| Clofibrat | −5/−8 | −4/−7 | ineffective | | ineffective | |

*established on the mouse upon oral administration.

The values given in columns A are the change in percentage of the value after the treatment referred to the value before the treatment (= 100 %) of the treated group; the values given in columns B are the change in percentage of the value after the treatment of the treated group referred to the value after the treatment (= 100 %) of the control group treated with placebos

B. DIETETIC HYPERLIPEMIA OF MALE RATS

By feeding a diet containing 2% of cholesterol and 20% of coco fat, a hyperlipemia was produced which could be verified by comparison with a control group fed with normal feed (cf. line 4 in table II; placebo group on diet = 100 %). At the same time the diet was offered, the compound of example 1 was administered in an amount of 10 or 3.3 mg/kg/day by means of an esophagal sound to the animals of the treated group (10 animals per dosage unit). After 10, 17 and 25 days the average concentration of cholesterol, triglycerides and lipid phosphorus was determined in the serum and compared to that of the placebo group on a diet (= 100 %).

The thioethers of the formula I may be used alone or in admixture with pharmacologically acceptable carriers, an oral dosage unit form being preferred. Pharmacologically acceptable carriers are, for example magnesium carbonate, lactose, corn starch or animal and vegetable oils. Suitable dosage unit forms are, for example tablets, hard gelatine capsules, powder and suspensions. The daily dosage unit ranges from about 3 to 200 mg/kg.

A special utility of the compounds of formula I is that they can be combined with other active substances, for example agents acting on the circulatory system, antidiabetics, other agents lowering the lipid livel, psychopharmaceuticals and vitamins.

The following examples illustrate the invention. The structure of the compounds described was evidenced by means of IR and NMR spectra and elementary analysis.

EXAMPLE 1

2-[1-benzylimidazolyl-(2)-thio]-propionic acid ethyl ester 19.3 g (0.1 mole) of 1-benzyl-2-mercapto-imidazole were introduced, while stirring, in a suspension of 4.4 g of 55 % sodium hydride (0.1 mole) in 100 ml of dimethyl formamide and stirring was continued for 30 minutes, whereupon a clear solution was obtained. 18.1 g (0.1 mole) of 2-bromopropionic acid ethyl ester in 20 ml of dimethyl formamide were added dropwise, while cooling to about 10°C. The mixture was slowly heated to about 90°C and stirred for 1 hour at that temperature, the solvent was largely distilled off in vacuo, chloroform was added to the residue and the sodium bromide was eliminated by shaking with water. After evaporation in vacuo, the organic phase left an oil which could be distilled in high vacuum without notable decomposition.

Yield: 22.3 g (77% of the theory);

boiling point under a pressure of 0.08 mm mercury: 165°C

TABLE II

Inhibition of the dietetic hyperlipemia

| Compound | dosage unit in mg/kg/day | change in percentage as compared with placebo groups of | | | | | | | |
|---|---|---|---|---|---|---|---|---|---|
| | | serum cholesterol after days | | | serum triglycerides after days | | serum lipid phosphorous* after days | | |
| | | 10 | 17 | 25 | 10 | 17 | 10 | 17 | 25 |
| of example 1 | 10 | −2 | −37 | −26 | −25 | −35 | +5 | −6 | −2 |
| | 3.3 | 0 | −31 | −26 | −15 | −27 | −5 | −14 | −8 |
| Clofibrat | 100 | −3 | −4 | +4 | −5 | −38 | −2 | −7 | +10 |
| normal food | — | −23 | −30 | −12 | −19 | −17 | −6 | −1 | −1 |

*determined according to the method of Boehringer/Mannheim

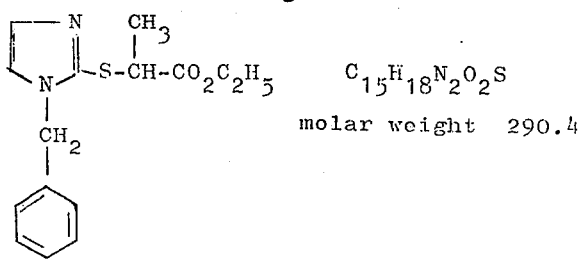

$C_{15}H_{18}N_2O_2S$ molar weight 290.4

Hydrochloride
$C_{15}H_{19}ClN_2O_2S$ MW 326.9
Melting point: 151° – 153°C (from ethanol/ether)

Analysis:
Calculated: C 55.1 % H 5.9 % Cl 10.8 % N 8.6 % S 9.8 %
found: C 54.9 % H 5.8 % Cl 11.3 % N 8.7 % S 9.7 %

EXAMPLE 2

2-[1-benzyl-imidazolyl-(2)-thio]-isobutyric acid ethyl ester

In a manner analogous to that of Example 1, 0.1 mol of 1-benzyl-2-mercaptoimidazole were reacted with 19.5 g (0.1 mol) of 2-bromoisobutyric acid ethyl ester after conversion into the mercaptide. AFter distillation of the crude product in high vacuum, the yield was 18.8 g (62% of the theory); boiling point under a pressure of 0.04 mm mercury: 160°C

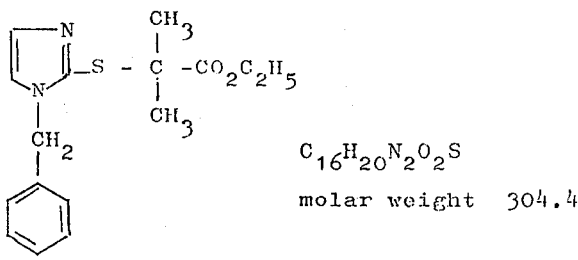

$C_{16}H_{20}N_2O_2S$ molar weight 304.4

Analysis:
Calculated: C 63.2 % H 6.6 % N 9.2 % S 10.5 %
found: C 63.6 % H 6.7 % N 9.5 % S 10.8 %

EXAMPLE 3

2-[1-phenylimidazolyl-(2)-thio]-propionic acid ethyl ester

In a manner analogous to that of Example 1, 17.6 g (0.1 mol) of 1-phenyl-2-mercapto-imidazole were converted into the sodium salt and then reacted with 18.1 g (0.1 mol) of 2-bromo-propionic acid ethyl ester. After distillation in high vacuum, the yield was 25.1 g (91 % of the theory);
boiling point under a pressure of 0.05 mm mercury: 150°C

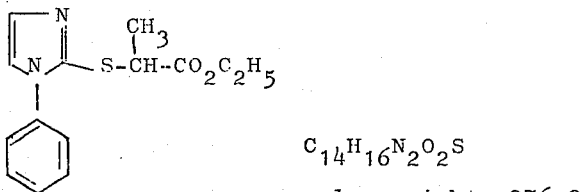

$C_{14}H_{16}N_2O_2S$ molar weight 276.3

Hydrochloride
$C_{14}H_{17}ClN_2O_2S$ molar weight 312.8
Melting point 108° – 109°C (from ethanol/ether)

Analysis:
Calculated: C 53.7 % H 5.5 % Cl 11.3 % N 9.0 % S 10.3 %
found: C 53.7 % H 5.5 % Cl 11.3 % N 8.9 % S 10.4 %

EXAMPLE 4

2-[1-phenylimidazolyl-(2)-thio]-isobutyric acid ethyl ester

The reaction of 17.6 g (0.1 mol) of 1-phenyl-2-mercaptoimidazole with 19.5 g (0.1 mol) of 2-bromo-isobutyric acid ethyl ester as described in Example 1 yielded the crystalline crude base which could be recrystallized from ether:
19.2 g (66 % of the theory)   Melting point: 79° – 81°C

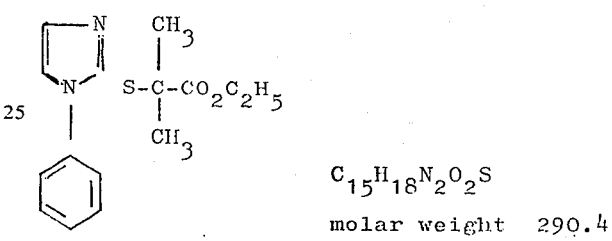

$C_{15}H_{18}N_2O_2S$ molar weight 290.4

Analysis:
Calculated: C 62.06 % H 6.25 % N 9.64 % S 11.04 %
found: C 62.0 % H 6.4 % N 10.0 % S 11.2 %

What is claimed is:

1. An imidazolyl-(2)-thioalkanoic acid ester of the formula

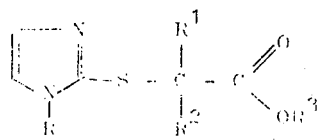

in which
R stands for phenyl, phen-$(C_1-C_3)$alkyl,
$R^1$ stands for hydrogen or $(C_1-C_3)$-alkyl and
$R^2$ and $R^3$ each stands for $(C_1-C_3)$-alkyl, or a physiologically acceptable acid addition salt thereof.

2. 2-[1-benzylimidazolyl-(2)-thio]-propionic acid ethyl ester.

3. 2-[1-benzylimidazolyl-(2)-thio]-isobutyric acid ethyl ester.

4. 2-[1-phenylimidazolyl-(2)-thio]-propionic acid ethyl ester.

5. 2-[1-phenylimidazolyl-(2)-thio]-isobutyric acid ethyl ester.

* * * * *